UNITED STATES PATENT OFFICE.

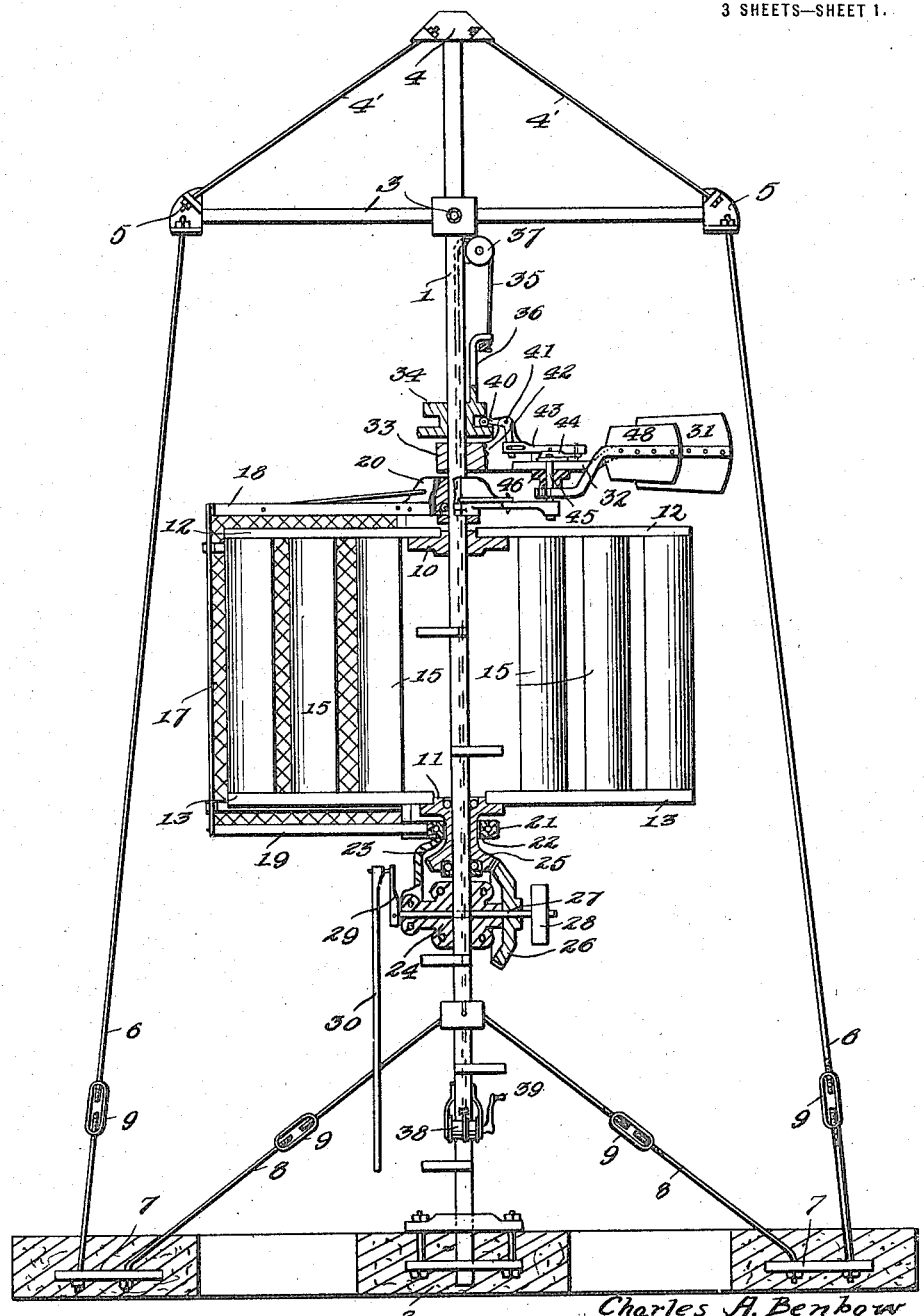

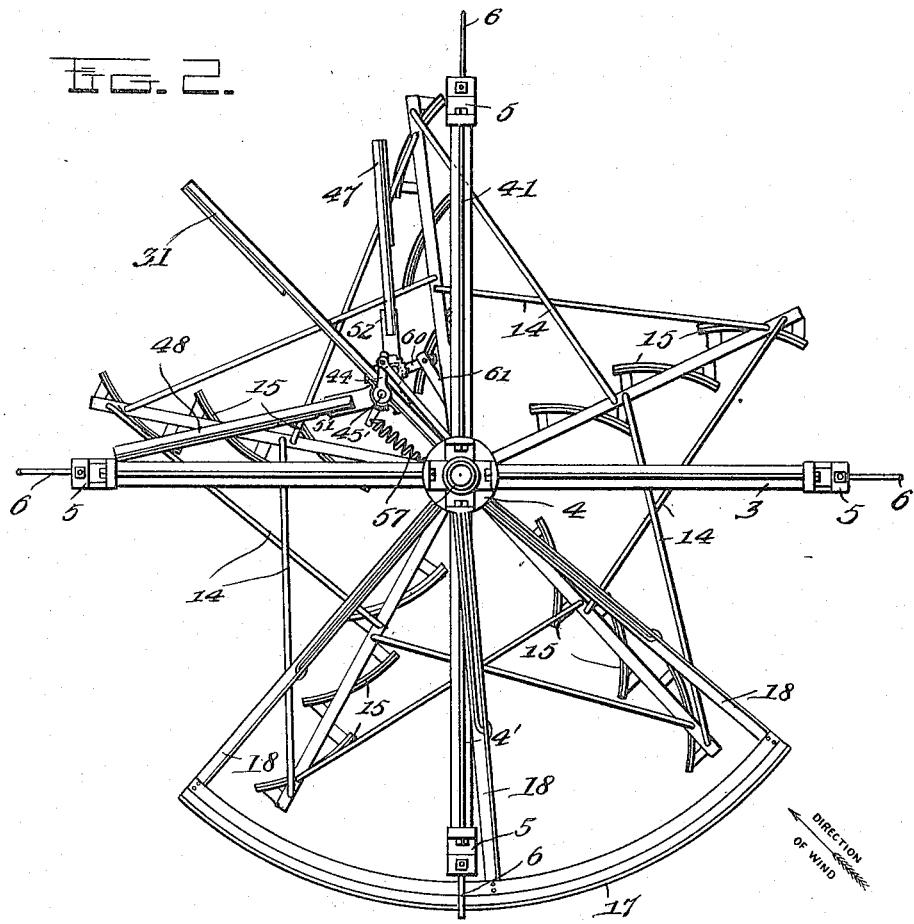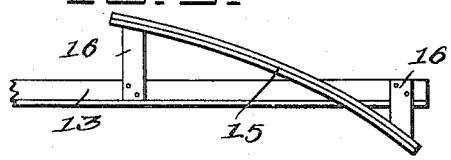

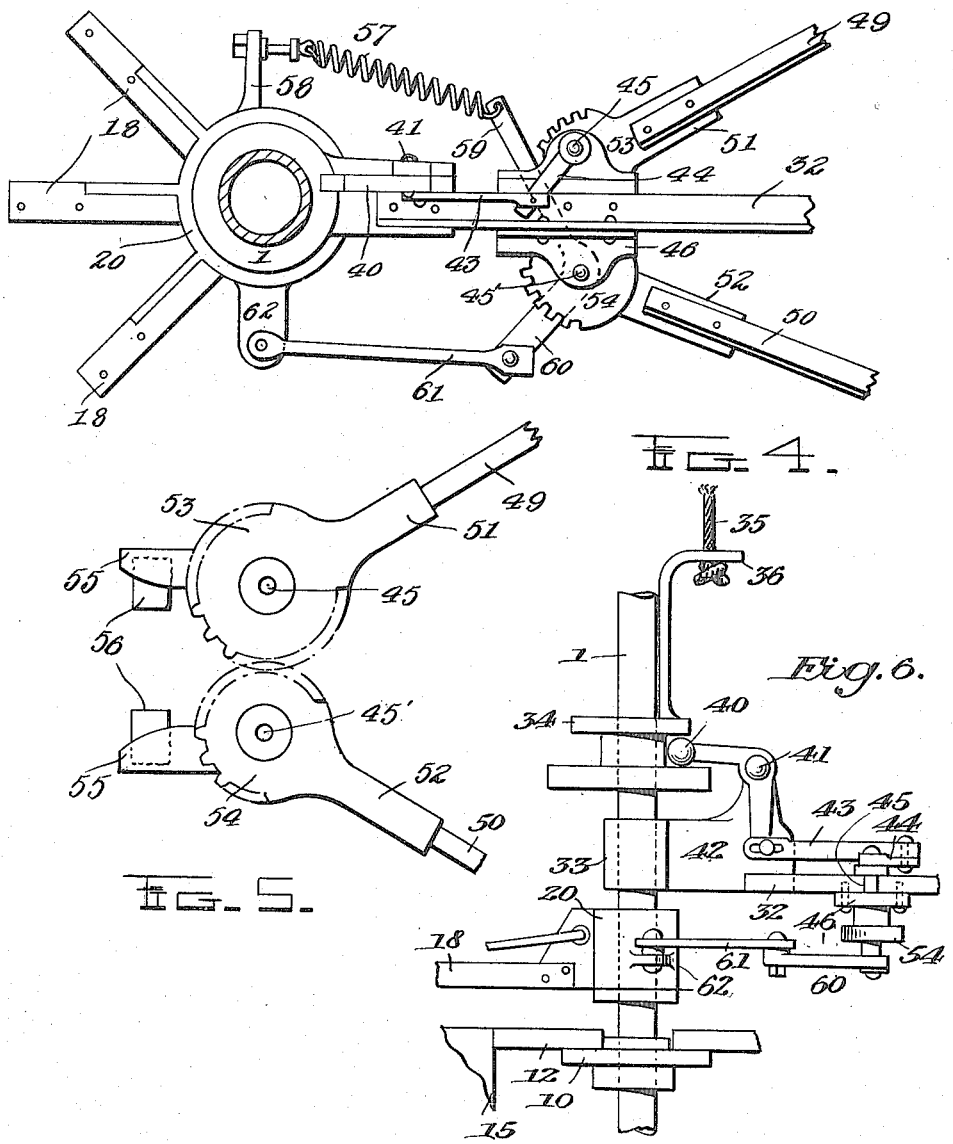

CHARLES A. BENBOW, OF PORTLAND, OREGON.

WINDMILL.

1,143,803.

Specification of Letters Patent.

Patented June 22, 1915.

Application filed August 20, 1913. Serial No. 785,690.

*To all whom it may concern:*

Be it known that I, CHARLES A. BENBOW, a citizen of the United States, residing at Portland, in the county of Multnomah and State of Oregon, have invented certain new and useful Improvements in Windmills, of which the following is a specification.

The present invention relates to improvements in wind wheels, and is designed to provide a wind motor involving improved features for rendering the wind mill facile in operation, durable, and efficient in performing the functions of a power supplying device of this character.

The invention consists in certain novel combinations and arrangements of parts in a rotary wind wheel whereby the wheel may be thrown out of the wind by manual power when desired, and in certain novel features whereby this purpose is accomplished automatically by an undesirable increase in wind pressure or velocity.

The invention further consists in certain novel combinations of details as will be more fully described hereinafter.

In the accompanying drawings I have illustrated one complete example of the physical embodiment of my invention constructed according to the best mode I have so far devised for the practical application of the principles of my invention.

Figure 1 is a side elevation of a wind motor, parts being shown in section, involving my invention. Fig. 2 is a top plan view of the wind motor in operative position. Fig. 3 is a detail of one of the fans or blades of the wind wheel. Fig. 4 is a top plan of the governor mechanism. Fig. 5 is an enlarged detail of a portion of the governor mechanism. Fig. 6 is an enlarged detail view of the shield regulating mechanism.

In the preferred embodiment of my invention as depicted in the drawings, the entire working part of the mechanism is supported upon a central tubular metallic column 1 which is embedded in a foundation 2 of suitable material, and near its upper ends is formed with cross braces or arms 3. A cap plate 4 at the extreme upper end of the column is connected by radiating rods or bars 4' with the angle brackets 5 at the outer ends of the cross arms 3, and these angle brackets have secured thereto truss rods 6 which are anchored at 7 in the foundation or base 2. Additional guy rods or bars 8 are utilized and extend from the lower portion of the column to the foundation anchor 7. By means of turn buckles 9, 9, the guy and truss rods may be tightened to true and hold the column in proper position.

The wind wheel which revolves on the center column comprises an upper bored casting 10 and a lower casting 11, from which extend the spiders 12 and 13 respectively. There are five arms to each spider, as illustrated in the drawings, and these arms are connected by braces 14 to render the wheel rigid. Between the upper and lower spider of the wheel frame are located the fans or blades 15, and it will be noted that these fans are curved or cupped, and that they extend vertically between the spiders of the wheel, being fastened thereto by means of the short brackets 16. The curved or concave arrangement of the fans or blades, in connection with the shield to be described, insures a quick presentation to the wind of the fans as they emerge from behind the shield, while the return side, which is convex presents a minimum of resistance to the wind. The frame of the wheel is preferably constructed of angle irons and is properly secured to the two castings which revolve about the column, and the fans are preferably of sheet iron of suitable dimension.

A shield 17 is revolubly supported on the column 1, and is designed to cover a portion of the wind wheel and its fans indicated as about ninety degrees of the wheel. This shield is of light material preferably fabric or cloth on a light wire mesh, the parts being cemented together with an adhesive, and the frame of the shield which is constructed of angle irons includes the upper and lower radial arms 18 and 19 respectively. The upper arms extend from the shield to the rotatable cast head 20 and the lower arms are connected to a sleeve or ring 21 which forms a part of a roller bearing about the casting or sleeve 22 integral with the frame 23 which is supported from the fixed block 24 on the column. Although the bearing ring 22 surrounds the lower casting 11 of the wind wheel frame, it will be noted that these parts are not in frictional contact.

The casting or sleeve 11 is formed with a gear wheel 25 which meshes with a similar bevel gear 26 revoluble with the crank shaft 27 which is supported in the bearing block or casting 24. At one end the crank shaft is provided with a balance or fly wheel 28, and at its other end a crank 29 has connected thereto a rod 30 which may be utilized to transmit power as desired.

It will be understood that the wind wheel is revolved by the wind because of the fact that the shield covers one half of the wheel that could be exposed to the wind as shown in Fig. 2 leaving the other portion or one quarter open to wind pressure so that the pressure of wind on the fans will revolve the wheel. The shield is held in position headed to the wind by means of the main weather vane 31 which it will be noted is on the opposite side of the diameter to the wind shield. The main vane 31 is connected by its arm 32 to the revoluble sleeve or collar 33 by means of which the vane may swing about the column 1 and steadily hold the shield in front of the wheel, as will be pointed out hereinafter. Thus the shield is free to revolve about the column, and may be moved either in front of the propelling side of the wheel to reduce pressure thereon, or it may be shifted to the front of the return side as desired. The position of the shield may be regulated either manually, as when throwing the motor into or out of the wind, or the shield may be moved automatically by the increased or decreased pressure of the wind on the governing devices as follows: Above the sleeve 33 on the column 1 a sliding spool 34 is arranged, and this spool may be lifted through the medium of a cord 35 attached to the arm 36 of the spool and the cord passes over a pulley 37 supported from the column 1 above the spool. From the pulley 37 the cord is passed down through the interior of the column and emerges therefrom to wind about a drum 38 that is supported on the column and may be turned by means of the crank handle 39. This is the manually operated means for throwing the motor into or out of operative position which accomplishes this result by lifting the spool to shift the shield over the propelling side of the wheel, or lowering it to shift the shield over the return side, through the bell crank 40 pivoted at 41 to an arm 42 of the sleeve 33 which is rotatable on the column. The lever 40 is pivoted to link 43 which is pivoted to arm 44 forming a crank on shaft 45. The shaft 45 and similar shaft 45' are journaled in a bearing block or casting 46 rigidly fixed by bolts to the arm 32 of the main weather vane. These shafts are revoluble in the bearing block 46 and carry respectively the vane 47 and the vane 48 of the governing device for the automatic regulation of the wind shield in its relation to the wind wheel. The vanes have arms 49 and 50 which are respectively attached to arms 51 and 52 of the toothed wheels 53 and 54. The wheels are fixed to the respective shafts 45 and 45' and rotate therewith, and are in continuous engagement with each other. Each wheel carries a lug 55 in which a rubber bumper 56 is held and these bumpers or cushions are so arranged that they receive the shock and cushion the movement whenever the two vanes 47 and 48 are so separated that these bumpers contact with each other, and the bumpers of course prevent unlimited movement of the governing vanes. It will be noted that the two vanes 47 and 48 are located at the sides of the main vane 9, and that the vane 48 is larger in area than the other one in order to offset the pressure of the wind on the shield. These governor vanes control the position of the wind shield in heavy wind, pulling it around in front of the propelling side of the wheel as the wind increases in velocity over the adjustment for which it is set. The governor vanes present their faces to the wind, as shown in the drawings, and thus are enabled to resist the momentum that the shield would otherwise gain in heading into shifting winds, and in this manner the vanes prevent the wind shield from shifting past the desired position with relation to the wind wheel, while it will be remembered that the main vane holds the shield steadily in the wind as long as its velocity and pressure are uniform.

A tension spring 57 is fixed at one end to a stationary arm 58 of the head 20 and at its other end is connected to an arm 59 that is fixed on the shaft 45' and revolves therewith. A second arm 60 of this lever is connected by pivoted link 61 to the arm 62 of the head 20 of the wind shield, and by this means the governor vanes may be adjusted and held until the velocity and pressure exceed the limit, when the wind forces each governor vane toward the main vane 9. This motion of the governor vanes causes the shaft 45' to draw on the link 61 (Fig. 4) and the movement of this link swings the wind shield around through the connection therewith of the arm 62, into position over the wind wheel, and as the velocity of the wind subsides again the vanes spread themselves permitting the wind shield to swing back and expose the former area of wheel.

It will be understood that the shield is steadied and held in position through the medium of the vane 31, regardless of the velocity of the wind, but the two vanes 47 and 48 are for the purpose of moving the shield, through the connection of arm 60, link 61 and arm 62, when the velocity of the wind becomes excessive. Thus the main vane 31 will stand at all times in the direction of the movement of the wind, but if the velocity of the wind becomes excessive, the two side vanes will close and swing the shield over in front of the revolving wheel. Now when the wind subsides the shield is permitted to return to its original position as maintained by the main vane.

By means of the drum 38 and cord 35 the spool 34 may be lifted, and by means of the connections previously described, the shafts 45 and 45' are revolved and this action furls back the two vanes pulling the shield around in the front of the wind wheel thus throwing the entire motor out of commission.

The operation and application of power of the motor mechanism will be readily understood as the rotary movement of the wind wheel is transmitted to the reciprocating rod 30 through the train of gears 25, 26 and crank shaft as described.

Having thus fully described my invention what I claim as new and desire to secure by Letters Patent is:—

1. The combination in a wind motor with a central supporting column and rotary wind wheel thereon, of a rotary shield on the column, a main vane connected to the shield to hold it in normal position so that it covers a portion of the wind wheel, and means for moving said shield comprising a vane at each side of the main vane and pivotally supported therefrom and connected to the shield.

2. The combination in a wind motor with a central supporting column and rotary wind wheel thereon, of a rotary shield on the column, a main vane holding the shield in normal position to cover a portion of the wheel, a pair of relatively movable vanes one of which is larger than the other pivoted on the main vane and having annular toothed portions in mesh, and connections from said vanes to the shield.

3. The combination in a wind motor with a central supporting column and rotary wind wheel thereon, of a rotary shield on the column and means for holding the shield in normal condition, a pair of relatively movable vanes pivoted on said holding means and having annular toothed portions in mesh, and connections from said vanes to the shield.

In testimony whereof I affix my signature in presence of two witnesses.

CHARLES A. BENBOW.

Witnesses:
CHARLES J. BERGLER,
JOHN A. WHITTEN.

Copies of this patent may be obtained for five cents each, by addressing the "Commissioner of Patents Washington, D. C."